US008308984B2

(12) United States Patent
Zhamu et al.

(10) Patent No.: US 8,308,984 B2
(45) Date of Patent: Nov. 13, 2012

(54) METHOD OF PRODUCING NANO-SCALED INORGANIC PLATELETS

(75) Inventors: Aruna Zhamu, Centerville, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 0 days.

(21) Appl. No.: 13/200,307

(22) Filed: Sep. 23, 2011

(65) Prior Publication Data

US 2012/0021293 A1 Jan. 26, 2012

Related U.S. Application Data

(62) Division of application No. 11/800,728, filed on May 8, 2007, now Pat. No. 7,824,651.

(51) Int. Cl.
*C01B 19/04* (2006.01)
*C01B 17/00* (2006.01)
(52) U.S. Cl. .................. 252/378 R; 423/509; 423/561.1
(58) Field of Classification Search .............. 252/378 R; 423/508, 209, 511, 561.1
See application file for complete search history.

(56) References Cited

U.S. PATENT DOCUMENTS

| 3,434,917 | A | 3/1969 | Kraus et al. |
| 3,885,007 | A | 5/1975 | Olsen et al. |
| 4,091,083 | A | 5/1978 | Hirschvogel et al. |
| 4,244,934 | A | 1/1981 | Kondo et al. |
| 4,822,590 | A * | 4/1989 | Morrison et al. .......... 423/561.1 |
| 4,895,713 | A | 1/1990 | Greinke et al. |
| 5,503,717 | A | 4/1996 | Kang et al. |
| 5,698,088 | A | 12/1997 | Kang et al. |
| 6,287,694 | B1 | 9/2001 | Zaleski et al. |
| 6,872,330 | B2 | 3/2005 | Mack et al. |
| 2006/0199013 | A1* | 9/2006 | Malshe et al. ................ 428/409 |

OTHER PUBLICATIONS

U.S. Appl. No. 11/509,424, filed Aug. 25, 2006, B. Z. Jang, et al.
U.S. Appl. No. 11/526,489, filed Sep. 26, 2006, B. Z. Jang, et al.
U.S. Appl. No. 11/709,274, filed Feb. 22, 2007, B. Z. Jang, et al.
U.S. Appl. No. 11/787,442, filed Apr. 17, 2007, A. Zhamu, et al.

* cited by examiner

*Primary Examiner* — Stanley Silverman
*Assistant Examiner* — Brian Walck

(57) ABSTRACT

The present invention provides a method of exfoliating a layered material (e.g., transition metal dichalcogenide) to produce nano-scaled platelets having a thickness smaller than 100 nm, typically smaller than 10 nm. The method comprises (a) dispersing particles of a non-graphite laminar compound in a liquid medium containing therein a surfactant or dispersing agent to obtain a stable suspension or slurry; and (b) exposing the suspension or slurry to ultrasonic waves at an energy level for a sufficient length of time to produce separated nano-scaled platelets. The nano-scaled platelets are candidate reinforcement fillers for polymer nanocomposites.

7 Claims, 1 Drawing Sheet

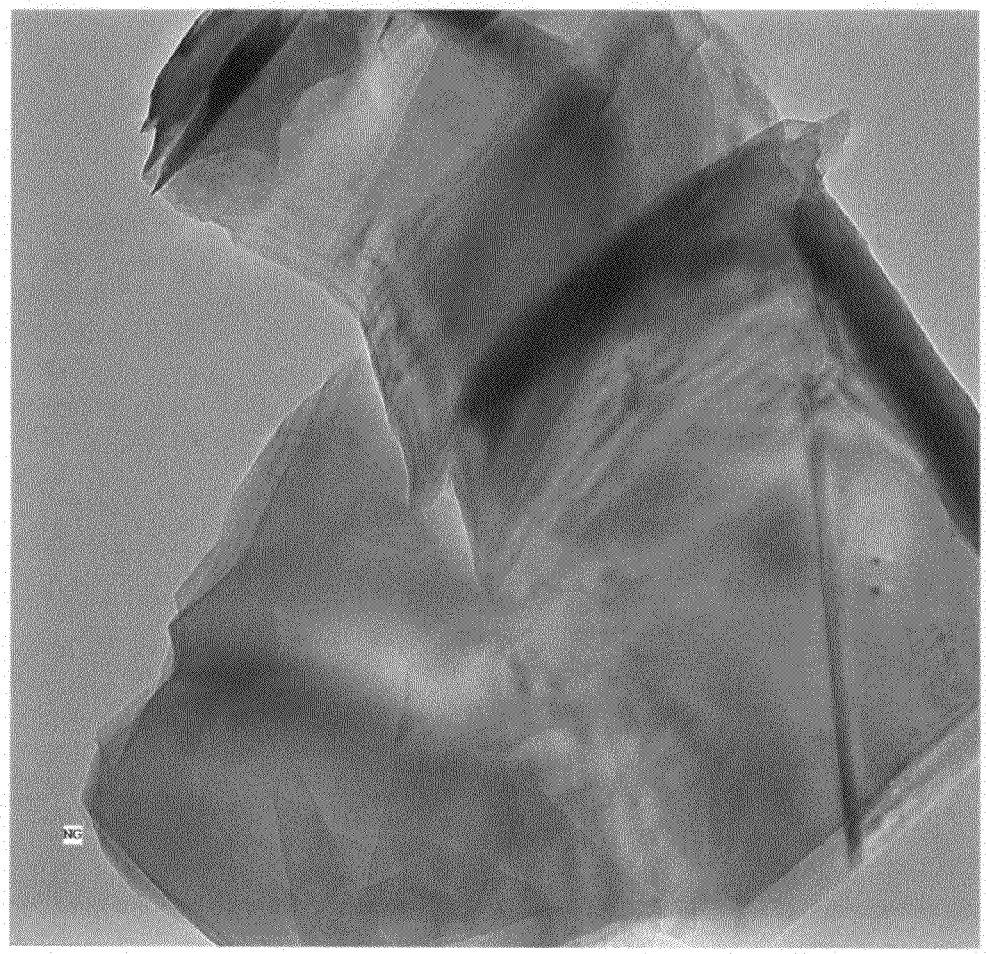

METHOD OF PRODUCING NANO-SCALED INORGANIC PLATELETS

This is a divisional application of Aruna Zhamu, et al, "Method of Producing Exfoliated Graphite, Flexible Graphite, and Nano-Scaled Graphene Plates," U.S. patent application Ser. No. 11/800,728 (May 8, 2007); now U.S. Pat. No. 7,824,651 (Nov. 2, 2010).

This invention is based on the research result of a US Department of Energy (DoE) Small Business Innovation Research (SBIR) project. The US government has certain rights on this invention.

FIELD OF THE INVENTION

The present invention relates to a method of exfoliating and separating graphite, graphite oxide, and other laminar compounds to produce nano-scaled platelets (particularly nano-scaled graphene platelets, NGPs) and re-compressed flexible graphite.

BACKGROUND

Carbon is known to have four unique crystalline structures, including diamond, graphite, fullerene and carbon nano-tubes. The carbon nano-tube (CNT) refers to a tubular structure grown with a single wall or multi-wall, which can be conceptually obtained by rolling up a graphene sheet or several graphene sheets to form a concentric hollow structure. A graphene sheet is composed of carbon atoms occupying a two-dimensional hexagonal lattice. Carbon nano-tubes have a diameter on the order of a few nanometers to a few hundred nanometers. Carbon nano-tubes can function as either a conductor or a semiconductor, depending on the rolled shape and the diameter of the tubes. Its longitudinal, hollow structure imparts unique mechanical, electrical and chemical properties to the material. Carbon nano-tubes are believed to have great potential for use in field emission devices, hydrogen fuel storage, rechargeable battery electrodes, and as composite reinforcements.

However, CNTs are extremely expensive due to the low yield and low production rates commonly associated with all of the current CNT preparation processes. The high material costs have significantly hindered the widespread application of CNTs. Rather than trying to discover much lower-cost processes for nano-tubes, we have worked diligently to develop alternative nano-scaled carbon materials that exhibit comparable properties, but can be produced in larger quantities and at much lower costs. This development work has led to the discovery of processes for producing individual nano-scaled graphite planes (individual graphene sheets) and stacks of multiple nano-scaled graphene sheets, which are collectively called "nano-scaled graphene plates (NGPs)." NGPs could provide unique opportunities for solid state scientists to study the structures and properties of nano carbon materials. The structures of these materials may be best visualized by making a longitudinal scission on the single-wall or multi-wall of a nano-tube along its tube axis direction and then flattening up the resulting sheet or plate. Studies on the structure-property relationship in isolated NGPs could provide insight into the properties of a fullerene structure or nano-tube. Furthermore, these nano materials could potentially become cost-effective substitutes for carbon nano-tubes or other types of nano-rods for various scientific and engineering applications. The electronic, thermal and mechanical properties of NGP materials are expected to be comparable to those of carbon nano-tubes; but NGP will be available at much lower costs and in larger quantities.

Direct synthesis of the NGP material had not been possible, although the material had been conceptually conceived and theoretically predicted to be capable of exhibiting many novel and useful properties. Jang and Huang have provided an indirect synthesis approach for preparing NGPs and related materials [B. Z. Jang and W. C. Huang, "Nano-scaled Graphene Plates," U.S. Pat. No. 7,071,258 (Jul. 4, 2006)]. In most of the prior art methods for making separated graphene platelets, the process begins with intercalating lamellar graphite flake particles with an expandable intercalation agent (intercalant), followed by thermally expanding the intercalant to exfoliate the flake particles. In some methods, the exfoliated graphite is then subjected to air milling, ball milling, or ultrasonication for further flake separation and size reduction. Conventional intercalation methods and recent attempts to produce exfoliated products or separated platelets are given in the following representative references:

1. J. W. Kraus, et al., "Preparation of Vermiculite Paper," U.S. Pat. No. 3,434,917 (Mar. 25, 1969).
2. L. C. Olsen, et al., "Process for Expanding Pyrolytic Graphite," U.S. Pat. No. 3,885,007 (May 20, 1975).
3. A. Hirschvogel, et al., "Method for the Production of Graphite-Hydrogensulfate," U.S. Pat. No. 4,091,083 (May 23, 1978).
4. T. Kondo, et al., "Process for Producing Flexible Graphite Product," U.S. Pat. No. 4,244,934 (Jan. 13, 1981).
5. R. A. Greinke, et al., "Intercalation of Graphite," U.S. Pat. No. 4,895,713 (Jan. 23, 1990).
6. F. Kang, "Method of Manufacturing Flexible Graphite," U.S. Pat. No. 5,503,717 (Apr. 2, 1996).
7. F. Kang, "Formic Acid-Graphite Intercalation Compound," U.S. Pat. No. 5,698,088 (Dec. 16, 1997).
8. P. L. Zaleski, et al. "Method for Expanding Lamellar Forms of Graphite and Resultant Product," U.S. Pat. No. 6,287,694 (Sep. 11, 2001).
9. J. J. Mack, et al., "Chemical Manufacture of Nanostructured Materials," U.S. Pat. No. 6,872,330 (Mar. 29, 2005).

However, these previously invented methods had a serious drawback. Typically, exfoliation of the intercalated graphite occurred at a temperature in the range of 800° C. to 1,050° C. At such a high temperature, graphite could undergo severe oxidation, resulting in the formation of graphite oxide, which has much lower electrical and thermal conductivities compared with un-oxidized graphite. In our recent studies, we have surprisingly observed that the differences in electrical conductivity between oxidized and non-oxidized graphite could be as high as several orders of magnitude. It may be noted that the approach proposed by Mack, et al. [e.g., Ref.9, U.S. Pat. No. 6,872,330] is also a low temperature process. However, it involves intercalating graphite with potassium melt, which must be carefully conducted in a vacuum or extremely dry glove box environment since pure alkali metals like potassium and sodium are extremely sensitive to moisture and pose an explosion danger. This process is not amenable to mass production of nano-scaled platelets.

To address these issues, we have recently developed several processes for producing nano-scaled platelets, as summarized in several co-pending patent applications [Refs. 10-13]:

10. Bor Z. Jang, Aruna Zhamu, and Jiusheng Guo, "Process for Producing Nano-scaled Platelets and Nanocomposites," U.S. patent Pending Ser. No. 11/509,424 (Aug. 25, 2006).

11. Bor Z. Jang, Aruna Zhamu, and Jiusheng Guo, "Mass Production of Nano-scaled Platelets and Products," U.S. patent Pending Ser. No. 11/526,489 (Sep. 26, 2006).
12. Bor Z. Jang, Aruna Zhamu, and Jiusheng Guo, "Method of Producing Nano-scaled Graphene and Inorganic Platelets and Their Nanocomposites," U.S. patent Pending Ser. No. 11/709,274 (Feb. 22, 2007).
13. Aruna Zhamu, JinJun Shi, Jiusheng Guo, and Bor Z. Jang, "Low-Temperature Method of Producing Nano-scaled Graphene Platelets and Their Nanocomposites," U.S. patent Pending Ser. No. 11/787,442 (Apr. 17, 2007).

References [10,11] are related to processes that entail a pressurized gas-induced intercalation procedure to obtain a tentatively intercalated layered compound and a heating and/or gas releasing procedure to generate a supersaturation condition for inducing exfoliation of the layered compound. Tentative intercalation implies that the intercalating gas molecules are forced by a high gas pressure to reside tentatively in the interlayer spaces. Once the intercalated material is exposed to a thermal shock, these gas molecules induce a high gas pressure that serves to push apart neighboring layers. Reference [12] is related to a halogen intercalation procedure, followed by a relatively low-temperature exfoliation procedure. No strong acid like sulfuric acid or nitric acid is used in this process (hence, no $SO_2$ or $NO_2$ emission) and halogen can be recycled and re-used. This is an environmentally benign process.

Reference [13] provides a low-temperature method of exfoliating a layered material to produce separated nano-scaled platelets. The method entails exposing a graphite intercalation compound to an exfoliation temperature lower than 650° C. for a duration of time sufficient to at least partially exfoliate the layered graphite without incurring a significant level of oxidation. This is followed by subjecting the partially exfoliated graphite to a mechanical shearing treatment to produce separated platelets. The key feature of this method is the exfoliation at low temperature to avoid oxidation of graphite. This was based on the finding that no oxidation of graphite occurs at 650° C. or lower for a short duration of heat exposure (e.g., shorter than 45 seconds) and at 350° C. or lower for a slightly longer duration of heat exposure (e.g., 2 minutes). The resulting NGPs exhibit very high electrical conductivity, much higher than that of NGPs obtained with exfoliation at higher temperatures.

In all of aforementioned prior art methods and our co-pending applications, the process begins with intercalation of graphite, followed by gas pressure-induced exfoliation of the resulting intercalated graphite. The gas pressure is generated by heating and/or chemical reaction. However, intercalation by a chemical (e.g., an acid) is not desirable. Exfoliation by heat can put graphite at risk of oxidation. After exfoliation, an additional mechanical shear treatment is needed to separate the exfoliated graphite into isolated platelets. In essence, every one of these processes involves three separate steps, which can be tedious and energy-intensive.

It is therefore an object of the present invention to provide a simpler, faster, and less energy-intensive method of expanding a laminar (layered) compound or element, such as graphite and graphite oxide (partially oxidized graphite), to produce exfoliated graphite and graphite oxide and nano-scaled graphite and graphite oxide flakes or platelets.

It is another object of the present invention to provide a convenient method of exfoliating a laminar material to produce nano-scaled platelets (platelets with a thickness smaller than 100 nm and mostly smaller than 10 nm) without the intercalation step and, hence, without the utilization of an intercalant such as sulfuric acid.

It is yet another object of the present invention to provide a convenient method of exfoliating a laminar material to produce nano-scaled platelets without involving a heat- or chemical reaction-induced gas pressurization step.

Another object of the present invention is to provide an effective and safe method of mass-producing nano-scaled platelets.

It is still another object of the present invention to provide a method of producing nano-scaled platelets that can be readily dispersed in a liquid to form a nanocomposite structure.

SUMMARY OF THE INVENTION

The present invention provides a method of exfoliating a layered material (e.g., graphite and graphite oxide) to produce nano-scaled platelets having a thickness smaller than 100 nm, typically smaller than 10 nm. The method comprises (a) dispersing graphite or graphite oxide particles in a liquid medium containing therein a surfactant or dispersing agent to obtain a suspension or slurry; and (b) exposing the suspension or slurry to ultrasonic waves (a process commonly referred to as ultrasonication) at an energy level for a sufficient length of time to produce the separated nano-scaled platelets.

Preferably, the ultrasonication step is conducted at a temperature lower than 100° C. The energy level is typically greater than 80 watts. Optionally, the ultrasonication step may be followed by a mechanical shearing treatment selected from air milling, ball milling, rotating-blade shearing, or a combination thereof to further separate the platelets and/or reduce the size of the platelets. The liquid medium may comprise water, organic solvent, alcohol, a monomer, an oligomer, or a resin. The layered graphite material could be natural graphite, synthetic graphite, highly oriented pyrolytic graphite, graphite oxide, graphite fiber, graphite nano-fiber, or a combination thereof.

Certain nano-scaled platelets (e.g., graphite oxides) are hydrophilic in nature and, therefore, can be readily dispersed in selected polar solvents (e.g., water). Hence, this invented method intrinsically involves dispersing the platelets in a liquid to form a suspension or in a monomer- or polymer-containing solvent to form a nanocomposite precursor suspension. This suspension can be converted to a mat or paper (e.g., by following a paper-making process). The nanocomposite precursor suspension may be converted to a nanocomposite solid by removing the solvent or polymerizing the monomer. In the case of graphite oxide platelets, the method may further include a step of partially or totally reducing the graphite oxide (after the formation of the suspension) to become graphite (serving to recover at least partially the high conductivity that a pristine graphite would have).

It may be noted that ultrasonication was used to successfully separate graphite flakes after exfoliation. Examples are given in Sakawaki, et al. ("Foliated Fine Graphite Particles and Method for Preparing Same," U.S. Pat. No. 5,330,680, Jul. 19, 1994); and Mack, et al. (U.S. Pat. No. 6,872,330, Mar. 29, 2005). However, there has been no report on the utilization of ultrasonic waves in directly exfoliating graphite or graphite oxide (with or without intercalation) and, concurrently, separating exfoliated particles into isolated or separated graphite flakes or platelets with a thickness less than 100 nm. Those who are skilled in the art of expandable graphite, graphite exfoliation, and flexible graphite have hitherto firmly believed that graphite or other laminar material must be intercalated first to obtain a stable intercalation compound prior to exfoliation. They have further believed that the exfoliation of graphite intercalation compounds necessarily involve high temperatures. It is extremely surprising for us to observe that prior intercalation is not required of graphite for exfoliation and that exfoliation can be achieved by using ultrasonic waves at relatively low temperatures (e.g., room temperature), with or without prior intercalation.

BRIEF DESCRIPTION OF THE DRAWINGS

FIG. 1 A transmission electron micrograph of graphite flakes obtained by ultrasonic wave-effected exfoliation and separation.

DETAILED DESCRIPTION OF PREFERRED EMBODIMENTS

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nano-fiber. In the case of a carbon or graphite fiber segment, the graphene plates may be a part of a characteristic "turbostratic structure."

One preferred specific embodiment of the present invention is a method of producing a nano-scaled graphene plate (NGP) material that is essentially composed of a sheet of graphene plane or multiple sheets of graphene plane stacked and bonded together. Each graphene plane, also referred to as a graphene sheet or basal plane, comprises a two-dimensional hexagonal structure of carbon atoms. Each plate has a length and a width parallel to the graphite plane and a thickness orthogonal to the graphite plane. The thickness of an NGP is 100 nanometers (nm) or smaller and more typically thinner than 10 nm with a single-sheet NGP being as thin as 0.34 nm. The length and width of a NGP are typically between 1 :m and 20 Φm, but could be longer or shorter. For certain applications, both length and width are smaller than 1 μm. In addition to graphite, graphite oxide and graphite fluoride are another two of the many examples of laminar or layered materials that can be exfoliated to become nano-scaled platelets.

Generally speaking, a method has been developed for concurrently exfoliating and separating a layered or laminar material to produce nano-scaled platelets having a thickness smaller than 100 nm and typically smaller than 10 nm. The method comprises no intercalation step, although the method is applicable to intercalated graphite or intercalated graphite oxide compounds as well.

Using graphite as an example, the first step may involve preparing a laminar material powder containing fine graphite particulates (granules) or flakes, short segments of carbon fiber or graphite fiber, carbon or graphite whiskers, carbon or graphitic nano-fibers, or their mixtures. The length and/or diameter of these graphite particles are preferably less than 0.2 mm (200 :m), further preferably less than 0.01 mm (10 :m). They can be smaller than 1 :m. The graphite particles are known to typically contain micron- and/or nanometer-scaled graphite crystallites with each crystallite being composed of multiple sheets of graphite plane.

Although intercalation is not a requirement, we have also chosen to investigate the exfoliation of intercalated compounds at low temperatures (e.g., room temperature). Intercalation of graphite is well-known in the art. A wide range of intercalants have been used; e.g., (a) a solution of sulfuric acid or sulfuric-phosphoric acid mixture, and an oxidizing agent such as hydrogen peroxide and nitric acid and (b) mixtures of sulfuric acid, nitric acid, and manganese permanganate at various proportions. Typical intercalation times are between 2 hours and two days. The resulting acid-intercalated graphite may be subjected to repeated washing and neutralizing steps to produce a laminar compound that is essentially graphite oxide. In other words, graphite oxide can be readily produced from acid intercalation of graphite flakes. It is important to emphasize that the presently invented method is applicable to both graphite and graphite oxide that are either un-intercalated or intercalated.

The second step of the presently invented method comprises dispersing laminar materials (e.g., graphite or graphite oxide particles) in a liquid medium (e.g., water, alcohol, or acetone) to obtain a suspension or slurry with the particles being suspended in the liquid medium. Preferably, a dispersing agent or surfactant is used to help uniformly disperse particles in the liquid medium. Most importantly, we have surprisingly found that the dispersing agent or surfactant facilitates the exfoliation and separation of the laminar material. Under comparable processing conditions, a graphite sample containing a surfactant usually results in much thinner platelets compared to a sample containing no surfactant. It also takes a shorter length of time for a surfactant-containing suspension to achieve a desired platelet dimension.

Surfactants or dispersing agents that can be used include anionic surfactants, non-ionic surfactants, cationic surfactants, amphoteric surfactants, silicone surfactants, fluoro-surfactants, and polymeric surfactants. Particularly useful surfactants for practicing the present invention include DuPont's Zonyl series that entails anionic, cationic, non-ionic, and fluoro-based species. Other useful dispersing agents include sodium hexametaphosphate, sodium lignosulphonate (e.g., marketed under the trade names Vanisperse CB and Marasperse CBOS-4 from Borregaard LignoTech), sodium sulfate, sodium phosphate, and sodium sulfonate.

Conventional exfoliation processes for producing graphite worms from a graphite material normally include exposing a graphite intercalation compound (GIC) to a high temperature environment, most typically between 850 and 1,050° C. These high temperatures were utilized with the purpose of maximizing the expansion of graphite crystallites along the c-axis direction. Unfortunately, graphite is known to be subject to oxidation at 350° C. or higher, and severe oxidation can occur at a temperature higher than 650° C. even just for a short duration of time. Upon oxidation, graphite would suffer from a dramatic loss in electrical and thermal conductivity.

In contrast, the presently invented method makes use of an ultrasonication temperature typically lying between 0° C. and 100° C. Hence, this method obviates the need or possibility to expose the layered material to a high-temperature, oxidizing environment. If so desired, the exfoliated product may be subjected to a subsequent mechanical shearing treatment, also at a relatively low temperature (e.g., room temperature), such as ball milling, air milling, or rotating-blade shearing. With this treatment, either individual graphene planes (one-layer NGPs) or stacks of graphene planes bonded together (multi-layer NGPs) are further reduced in thickness (multi-layer NGPs), width, and length. In addition to the thickness dimension being nano-scaled, both the length and width of these NGPs could be reduced to smaller than 100 nm in size if so desired. In the thickness direction (or c-axis direction normal to the graphene plane), there may be a small number of graphene planes that are still bonded together through the van der Waal's forces that commonly hold the basal planes together in a natural graphite. Typically, there are less than 30 layers (often less than 5 layers) of graphene planes, each with length and width from smaller than 1 Φm to 100 Φm. High-energy planetary ball mills and rotating blade shearing devices (e.g., Cowles) were found to be particularly effective in producing nano-scaled graphene plates. Since ball milling and rotating-blade shearing are considered as mass production processes, the presently invented method is capable of producing large quantities of NGP materials cost-effectively. This is in sharp contrast to the production and purification processes of carbon nano-tubes, which are slow and expensive.

Ultrasonic or shearing energy also enables the resulting platelets to be well dispersed in the very liquid medium, producing a homogeneous suspension. One major advantage of this approach is that exfoliation, separation, and dispersion are achieved in a single step. A monomer, oligomer, or polymer may be added to this suspension to form a suspension that is a precursor to a nanocomposite structure.

The process may include a further step of converting the suspension to a mat or paper (e.g., using any well-known paper-making process), or converting the nanocomposite precursor suspension to a nanocomposite solid. If the platelets in a suspension comprise graphite oxide platelets, the process may further include a step of partially or totally reducing the graphite oxide after the formation of the suspension. The steps of reduction are illustrated in an example given in this specification.

Alternatively, the resulting platelets, after drying to become a solid powder, may be mixed with a monomer to form a mixture, which can be polymerized to obtain a nanocomposite solid. The platelets can be mixed with a polymer melt to form a mixture that is subsequently solidified to become a nanocomposite solid.

The following examples serve to provide the best modes of practice for the present invention and should not be construed as limiting the scope of the invention:

EXAMPLE 1

Nano-Scaled Graphene Platelets (NGPs) from Natural Graphite Flakes

Five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction for a period of 2 hours.

EXAMPLE 2

Nano-Scaled Graphene Platelets (NGPs) from Natural Graphite Flakes (No Dispersing Agent)

Five grams of graphite flakes, ground to approximately 20 μm or less in sizes, were dispersed in 1,000 mL of deionized water to obtain a suspension. An ultrasonic energy level of 85 W (Branson S450 Ultrasonicator) was used for exfoliation, separation, and size reduction for a period of 2 hours.

EXAMPLE 3

Further Shear Treatment

A small portion of the exfoliated graphite particles (from Example 2) was then ball-milled in a high-energy plenary ball mill machine for 24 hours to produce nano-scaled particles with reduced length and width.

EXAMPLE 4

Exfoliation and Separation of Graphite Oxide

Graphite oxide was prepared by oxidation of graphite flakes with sulfuric acid, nitrate, and permanganate according to the method of Hummers [U.S. Pat. No. 2,798,878, Jul. 9, 1957]. Upon completion of the reaction, the mixture was poured into deionized water and filtered. The graphite oxide was repeatedly washed in a 5% solution of HCl to remove most of the sulphate ions. The sample was then washed repeatedly with deionized water until the pH of the filtrate was neutral. The slurry was spray-dried and stored in a vacuum oven at 60° C. for 24 hours. The interlayer spacing of the resulting laminar graphite oxide was determined by the Debey-Scherrer X-ray technique to be approximately 0.73 nm (7.3 Å).

Two grams of graphite flakes, ground to approximately 20 μm or less in sizes, were dispersed in 500 mL of deionized water (containing 0.1% by weight of a dispersing agent, Triton X-100)) to obtain a suspension. An ultrasonic energy level of 85 W (Branson S450 Ultrasonicator) was used for exfoliation, separation, and size reduction for a period of 1 hour.

The dimensions and electrical conductivity values of the fully separated graphite flakes or NGPs of Samples A-D are summarized in Table 1. The electrical conductivity was measured on "flexible graphite" samples that were prepared by stacking graphene platelets and compressing the stacked platelets between two platens in a hydraulic press.

TABLE 1

Dimensions and electrical conductivity of NGPs prepared under different conditions.

| Sample | Average platelet length (Φm) | Average platelet thickness (nm) | Electrical conductivity (S/cm) |
|---|---|---|---|
| 1 | 3.5 | 4.5 | 3,500 |
| 2 | 4.6 | 38.6 | 2,800 |
| 3 | 3.2 | 19.4 | 3,200 |
| 4 | 3.3 | 9.8 | 37 |

It is of significance to note that the presently invented approach of utilizing a dispersing agent or surfactant in a liquid medium enables the ultrasonic waves to produce NGPs that are much thinner (e.g., 4.5 nm in Example 1) as compared to a suspension without a dispersion agent (e.g., 38.6 nm in Example 2). Without a high-temperature exposure (hence, relatively oxidation-free), this new approach also leads to NGPs with a much higher conductivity; e.g., 2,800-3,500 S/cm as opposed to approximately 1,500 S/cm or lower commonly reported for commercially available flexible graphite sheet.

EXAMPLE 5

NGP Nanocomposites

Approximately 2 grams of NGPs prepared by spray-drying a portion of the sample prepared in Example 1 was added to 100 mL of water and a 0.2% by weight of a surfactant, sodium dodecylsulfate (SDS), to form a slurry, which was then subjected to ultrasonication at approximately 20° C. for five minutes. A stable dispersion (suspension) of well-dispersed nano-scaled graphite platelets was obtained. A water-soluble polymer, polyethylene glycol (1% by weight), was then added to the suspension. Water was later vaporized, resulting in a nanocomposite containing NGPs dispersed in a polymer matrix.

EXAMPLE 6

NGPs from Short Carbon Fiber Segments

The procedure was similar to that used in Example 1, but the starting material was graphite fibers chopped into segments with 0.2 mm or smaller in length prior to dispersion in water. The diameter of carbon fibers was approximately 12 µm. After ultrasonication for 4 hours at 85 W, the platelets exhibit an average thickness of 9.8 nm.

EXAMPLE 7

NGPs from Carbon Nano-Fibers (CNFs)

A powder sample of graphitic nano-fibers was prepared by introducing an ethylene gas through a quartz tube pre-set at a temperature of approximately 800 EC. Also contained in the tube was a small amount of nano-scaled Cu—Ni powder supported on a crucible to serve as a catalyst, which promoted the decomposition of the hydrocarbon gas and growth of CNFs. Approximately 2.5 grams of CNFs (diameter of 10 to 80 nm) were dispersed in water (as in Sample 1). The sample was then subjected to ultrasonication at 20 EC for two hours to effect exfoliation and separation, followed by a mechanical shearing treatment using a rotating-blade device (Cowles). Fine NGPs with an average thickness of 4.5 nm were obtained.

EXAMPLE 8

Graphite Oxide Nano Platelets, their Nanocomposites, and their Reduced Versions

The resulting nano platelets obtained in Example 4 were well-dispersed in water, forming a stable water dispersion (suspension). Upon removal of water, the nano platelets settled to form an ultra-thin nano-carbon film (a mat or paper). A small amount of water-soluble polymer (e.g., poly vinyl alcohol) was added to the nano platelet-water suspension with the polymer dissolved in water. The resulting nano platelet suspension with polymer-water solution as the dispersing medium was also very stable. Upon removal of water, polymer was precipitated out to form a thin coating on nano platelets. The resulting structure is a graphite oxide reinforced polymer nanocomposite.

A small amount of the nano platelet-water suspension was reduced with hydrazine hydrate at 100° C. for 24 hours. As the reduction process progressed, the brown-colored suspension of graphite oxides turned black, which appeared to become essentially graphite nano platelets or NGPs.

Another attempt was made to carry out the reduction of the graphite oxide nano platelets prepared via the presently invented method. In this case, hydrazine hydrate reduction was conducted in the presence of poly (sodium 4-styrene sulfonate) (PSS with Mw=70,000 g/mole). A stable dispersion was obtained, which led to PSS-coated NGPs upon removal of water. This is another way of producing platelet-based nanocomposites.

EXAMPLE 9

Production of Molybdenum Diselenide Nano Platelets

The same sequence of steps can be utilized to form nano platelets from other layered compounds: dispersion of a layered compound, ultrasonication, and an optional mechanical shear treatment. Dichalcogenides, such as $MoS_2$, have found applications as electrodes in lithium ion batteries and as hydro-desulfurization catalysts.

For instance, $MoSe_2$ consisting of Se—Mo—Se layers held together by weak van der Waals forces can be exfoliated via the presently invented process. Intercalation can be achieved by dispersing $MoSe_2$ powder in a silicon oil beaker, with the resulting suspension subjected to ultrasonication at 120 W for two hours. The resulting $MoSe_2$ platelets were found to have a thickness in the range of approximately 1.4 nm to 13.5 nm with most of the platelets being mono-layers or double layers.

Other single-layer platelets of the form $MX_2$ (transition metal dichalcogenide), including $MoS_2$, $TaS_2$, and $WS_2$, were similarly exfoliated. Again, most of the platelets were mono-layers or double layers. This observation clearly demonstrates the versatility of the presently invented process in terms of producing relatively uniform-thickness platelets.

It is clear that the presently invented method is also applicable to non-graphite, layered materials. Complete exfoliation and separation are effected at a low temperature using ultrasonication, optionally followed by a mechanical shearing treatment. Hence, another preferred embodiment of the present invention is a method of exfoliating a layered material to produce separated nano-scaled platelets having a thickness smaller than 100 nm (mostly smaller than 5 nm). The method comprises: (a) dispersing particles of a layered material in a liquid medium containing therein a surfactant or dispersing agent to produce a stable suspension or slurry; and (b) exposing this suspension or slurry to ultrasonication at an energy level for a sufficient length of time to produce the desired separated nano-scaled platelets.

In the aforementioned Example 1, a desired amount of fully separated graphene platelets were stacked and re-compressed to become flexible graphite sheets for the purpose of measuring the relative electrical conductivity of these platelets. The resulting flexible graphite sheets, having been exposed to no significant oxidation, exhibit an electrical conductivity typically higher than 3,200 S/cm. By contrast, commercially available flexible graphite sheets, normally having experienced a high exfoliation temperature (though possibly under a protective gas atmosphere), exhibit an electrical conductivity typically in the vicinity of 1,100 S/cm.

In conclusion, the presently invented method has many advantages over prior art methods of exfoliating layered materials for producing nano-scaled platelets. Summarized below are some of the more salient features or advantages:

(1) The present method is versatile and applicable to essentially all layered materials including, but not limited to, carbon- or graphite-based layered materials.
(2) The method does not involve a high exfoliation temperature (e.g., typically below 100° C.) and, hence, avoids undesirable high-temperature chemical reactions (e.g., avoids oxidation of graphite). The resulting NGPs exhibit excellent conductivity.

(3) The prior art step of intercalation, which typically involves using an undesirable acid such as sulfuric and nitric acid, can be avoided in the presently invented method. Hence, this is a much more environmentally benign process. This method is applicable to a wide range of liquid media (water, organic solvents, monomers, oligomers, etc.). Exfoliation, separation, and dispersion are essentially combined into one step.

(4) This method is amenable to the preparation of various precursor forms (e.g., suspension, paper, mat, thin film, and lamina) to nanocomposites.

The invention claimed is:

1. A method of exfoliating a layered material to produce separated nano-scaled platelets having a thickness smaller than 100 nm, said method comprising:
   a) dispersing particles of a layered material in a liquid medium containing therein a surfactant or dispersing agent to produce a suspension or slurry, wherein said layered material is selected from a transition metal dichalcogenide, $MoS_2$, $TaS_2$, $WS_2$, $MoSe_2$, $TaSe_2$, $WSe_2$, or a combination thereof and said layered material has never been subjected to intercalation; and
   b) exposing said suspension or slurry to ultrasonication at an energy level for a sufficient length of time to produce said separated nano-scaled platelets.

2. The method of claim 1 wherein said ultrasonication step is conducted at a temperature lower than 100° C.

3. The method of claim 1 wherein said energy level is greater than 80 watts.

4. The method of claim 1 wherein said ultrasonication step is followed by a mechanical shearing treatment selected from air milling, ball milling, rotating blade shearing, or a combination thereof.

5. The method of claim 1 wherein said liquid medium comprises water, organic solvent, alcohol, a monomer, an oligomer, or a resin.

6. The method of claim 1 wherein said platelets comprise single-layer or double-layer platelets.

7. The method of claim 1 wherein said surfactant or dispersing agent is selected from the group consisting of anionic surfactants, nonionic surfactants, cationic surfactants, amphoteric surfactants, silicone surfactants, fluoro-surfactants, polymeric surfactants, sodium hexametaphosphate, sodium lignosulphonate, poly (sodium 4-styrene sulfonate), sodium dodecylsulfate, sodium sulfate, sodium phosphate, sodium sulfonate, and combinations thereof.

* * * * *